US012722669B2

(12) United States Patent
Hellige et al.

(10) Patent No.: US 12,722,669 B2
(45) Date of Patent: Sep. 1, 2026

(54) POWER SUPPLY SYSTEM FOR GROUPS OF ELECTRICAL LOADS

(71) Applicant: HARTING ELECTRIC STIFTUNG & CO. KG, Espelkamp (DE)

(72) Inventors: Denny Hellige, Bad Oeynhausen (DE); Walter Gerstl, Breitenfurth bei Wien (AT); Albert Ferderer, Espelkamp (DE)

(73) Assignee: HARTING ELECTRIC STIFTUNG & CO. KG, Espelkamp (DE)

( * ) Notice: Subject to any disclaimer, the term of this patent is extended or adjusted under 35 U.S.C. 154(b) by 396 days.

(21) Appl. No.: 18/563,590

(22) PCT Filed: May 13, 2022

(86) PCT No.: PCT/DE2022/100362
§ 371 (c)(1),
(2) Date: Nov. 22, 2023

(87) PCT Pub. No.: WO2022/247986
PCT Pub. Date: Dec. 1, 2022

(65) Prior Publication Data

US 2024/0286656 A1 Aug. 29, 2024

(30) Foreign Application Priority Data

May 26, 2021 (DE) ..................... 10 2021 113 556.7

(51) Int. Cl.
*B61G 5/10* (2006.01)
*H01R 31/02* (2006.01)
*H02G 15/08* (2006.01)

(52) U.S. Cl.
CPC ............... *B61G 5/10* (2013.01); *H01R 31/02* (2013.01); *H02G 15/08* (2013.01); *H01R 2201/26* (2013.01)

(58) Field of Classification Search
CPC ...... B61G 5/10; H01R 31/02; H01R 2201/26; H02G 15/08
See application file for complete search history.

(56) References Cited

U.S. PATENT DOCUMENTS 4,351,309 A * 9/1982 Schleupen ............... B62J 29/00 200/19.32
5,501,605 A * 3/1996 Ozaki ................. B60R 16/0207 439/724

(Continued)

FOREIGN PATENT DOCUMENTS

CN 103283100 A 9/2013
CN 105556756 A 5/2016

(Continued)

OTHER PUBLICATIONS

International Preliminary Report on Patentability, dated Nov. 21, 2023, for International Patent Application No. PCT/DE2022/100362. (7 pages).

(Continued)

*Primary Examiner* — Thanh Tam T Le
(74) *Attorney, Agent, or Firm* — Seed Intellectual Property Law Group LLP

(57) ABSTRACT

A power supply system is provided for groups of electrical loads, wherein a group of loads can be split into at least two segments of the group of loads, such as transportation systems comprising at least two segments of transportation systems, wherein the segments each have a first end region and a second end region and also at least one electrical load which is fed with electrical power by the power supply system. To this end, the segments of the group of loads have at least one connection device at the first end region and at least one connection device at the second end region, wherein each connection device has connections which are of substantially structurally identical design and render (Continued)

possible electrical connection of the connection devices within one segment of the group of loads and also connection of the segments of the group of loads to one another.

12 Claims, 1 Drawing Sheet

(56) References Cited

U.S. PATENT DOCUMENTS

| | | | | |
|---|---|---|---|---|
| 6,334,791 | B1 * | 1/2002 | Yeh | H01R 24/44 333/185 |
| 6,439,923 | B1 * | 8/2002 | Kirkendall | H01R 27/02 439/502 |
| 6,744,147 | B2 * | 6/2004 | Taniguchi | B60R 16/0207 307/10.1 |
| 7,275,967 | B1 * | 10/2007 | Olliff | H01R 31/02 439/654 |
| 7,841,911 | B2 * | 11/2010 | Aizawa | H05K 9/0067 439/949 |
| 8,314,603 | B2 * | 11/2012 | Russell | G02B 6/3895 439/502 |
| 8,535,090 | B2 * | 9/2013 | Su | H01R 27/02 439/502 |
| 8,747,138 | B2 * | 6/2014 | Brune | H01R 13/521 439/278 |
| 9,825,394 | B2 * | 11/2017 | Naganishi | H01R 11/09 |
| 9,887,504 | B1 * | 2/2018 | Luo | H01R 24/60 |
| 11,726,281 | B2 * | 8/2023 | Hynes | G02B 6/4278 385/66 |
| 11,817,234 | B2 * | 11/2023 | Kumar | H01R 31/02 |
| 12,237,630 | B2 * | 2/2025 | Zucca | H01R 25/003 |
| 12,531,508 | B2 * | 1/2026 | He | H02S 40/34 |
| 2014/0008169 | A1 | 1/2014 | Kawasaki et al. | |
| 2016/0134096 | A1 | 5/2016 | Kett et al. | |
| 2020/0239045 | A1 | 7/2020 | Jaskiewicz et al. | |

FOREIGN PATENT DOCUMENTS

| | | | |
|---|---|---|---|
| CN | 111201175 | A | 5/2020 |
| DE | 102017222101 | B3 | 5/2019 |
| DE | 102019112007 | A1 | 11/2020 |
| DE | 102020108458 | A1 | 9/2021 |
| EP | 2665147 | A1 | 11/2013 |
| EP | 3470296 | A1 | 4/2019 |
| JP | H08310394 | A | 11/1996 |
| WO | 2019110763 | A1 | 6/2019 |

OTHER PUBLICATIONS

Standard UIC 552, vol. 9, 1997, Supplying the trains with electrical energy—Technical unit characteristics the train busbar (ZS), 28 pages.

International Search Report and Written Opinion, mailed Aug. 23, 2022, for International Patent Application No. PCT/DE2022/100362. (11 pages) (with English translation of International Search Report).

Office Action, dated Mar. 3, 2022, for German Patent Application No. 10 2021 113 556.7 (6 pages).

* cited by examiner

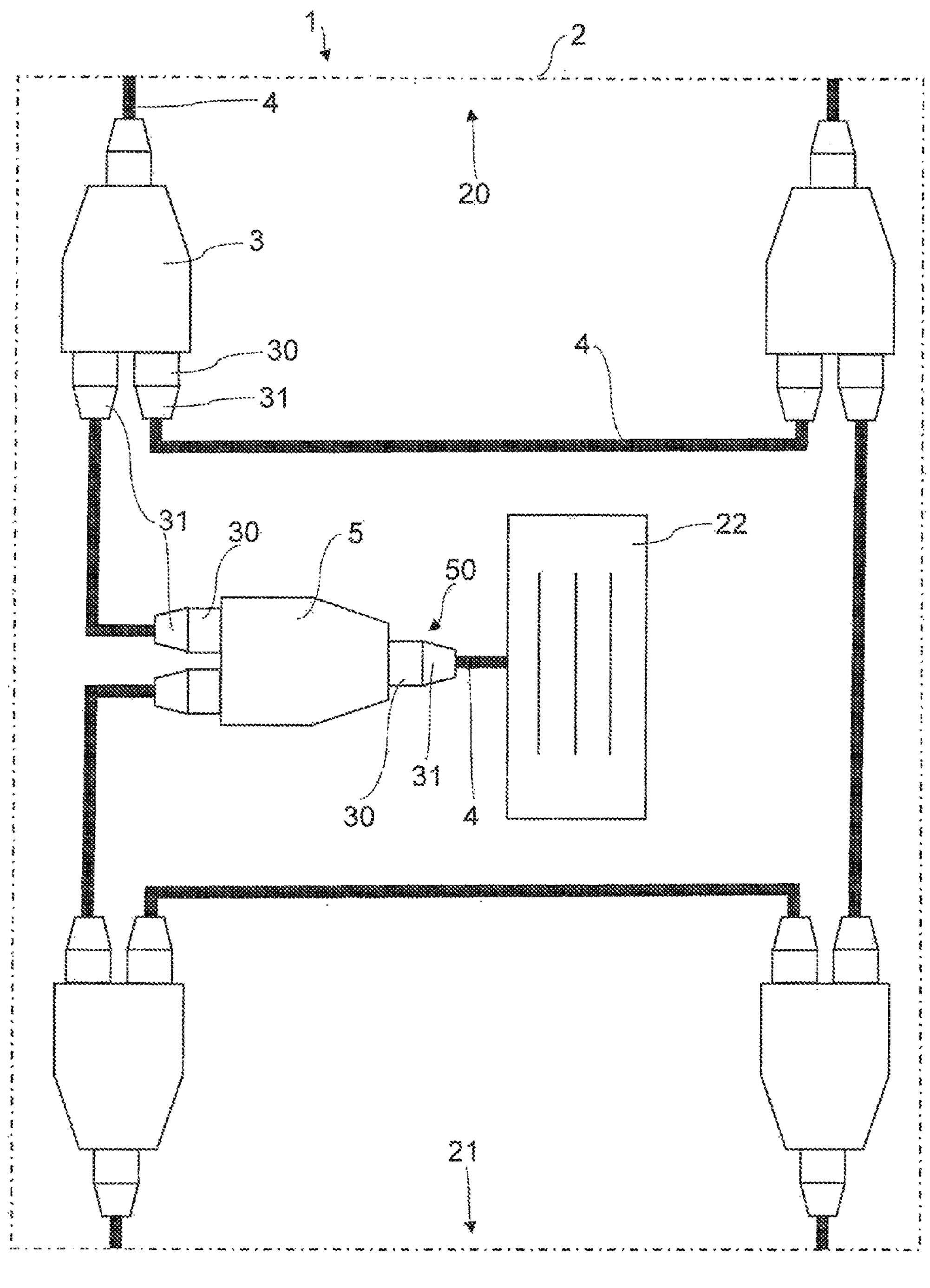
1
2
4
20
3
30
4
31
31
30
5
22
50
31
30
4
21

POWER SUPPLY SYSTEM FOR GROUPS OF ELECTRICAL LOADS

BACKGROUND

Technical Field

The present disclosure relates to a power supply system for groups of electrical loads, such as transportation systems comprising a plurality of units.

Such power supply systems are required, for example, in order to supply electrical energy to rail passenger transportation systems, i.e., railroad cars for passenger transportation. Such power supply systems are employed in the domain of so-called "fixed trainsets," i.e., a formation of railroad cars which is changed rarely or not at all. The loads to be supplied with power here can differ from one another within the group. Alternatively, such a power supply system can be used to supply production lines.

Description of the Related Art

It is proposed in the prior art, for example, in order to supply railroad cars in the UIC 552 train busbar with power, to provide rail vehicles with so-called fixed wiring below the floor in order to supply power. To do this, the two ends of a car are equipped with in each case, two connection devices for electric current. The connection devices are interconnected to permanently installed, usually rigidly designed conductors underneath the car. The connection devices are here designed such that multiple plugging cycles are enabled. There can be a matter of several thousand plugging cycles (5000 plugging cycles) in UIC 552. The connection devices are furthermore designed in such a way that, for example, a first connection device is connected to a second connection device. Connection of the first connection unit to a structurally identical first connection unit is not intended or not possible here. The different connection units are used, on the one hand, to transmit power from one unit to the next, i.e., from a locomotive to a car, and between cars, and, on the other hand, they are used for the redundant supply of power to a consumer which is arranged on the respective unit.

Although this concept has proven to be successful over a long period of time, there are many disadvantageous factors in the current designs of electric groups of means of transportation. Particular disadvantages in the prior art are the poor maintainability, the rigid design of the system, and generally also a high weight and a significant space requirement. These disadvantages are the result, among other things, of the at least three differently designed connection units per car which are provided for in UIC 552.

The disadvantages described can be seen, in particular, in fixed trainsets because the connection devices never reach a number of plugging cycles which is envisaged in the prior art. A "fixed trainset" here means a group of power cars, cars, a locomotive or similar units which remains in a previously planned configuration. The previous solution from the prior art is outdated and inefficient because of the high demand for electricity in modern passenger rail transportation. Especially in the case of highly loaded contact elements such as, for example, in the domain of rail traffic, because of ever greater requirements there is an increasing need for repair and maintenance, for example by electric discharge machining or electrical corrosion, because of the high current strengths of over 500V to several kilovolts.

A search made by the German Patent and Trademark Office has found the following prior art in the priority application to the present application: DE 10 2017 222 101 B3, EP 2 665 147 A1, EP 3 470 296 A1, and the standard UIC 552 1997-01-00.

BRIEF SUMMARY

Embodiments of the present disclosure provide a power supply system for groups of electrical loads, such as transportation systems comprising multiple units, which, in the case of an at least identical or improved power supply capacity, enables at least the same current-carrying capacity, a lower overall weight, a reduced size, and an increased maintainability and/or repairability.

The power supply system according to embodiments of the invention described herein is intended for groups of electrical loads, wherein a group of loads consists or comprises of at least two segments of the group of loads, in particular a transportation system comprising at least two transportation segments which each have a first end region and a second end region, as well as in each case at least one electrical energy-consuming device, which are fed by the power supply system. A segment of the group of loads with the number n is brought into electrically conductive connection, on the one hand, with at least a first connection region of the segment of the group of loads n−1 and/or, on the other hand, with a second connection region of the segment of the group of loads n+1. This means that the power supply system is designed as a mesh network, the meshes of which are each assigned to a segment of the group of loads, wherein each mesh features at least two connection devices and wherein at least a first connection device is arranged along the first end region and at least a second connection device is arranged at the second end region. Each connection device has at least two terminals for receiving in each case an electrical connector, wherein the electrical connectors are in turn connected to an electrical conductor. In embodiments, the connection devices have terminals of essentially the same structure and the connectors are formed so that they are compatible with the terminals of the connection devices. The connection devices are here designed to transmit particularly high electrical current strengths and/or high electrical voltage. "High electrical current strength" means over 100 amperes. In some embodiments, high electrical current strength may mean a current strength of over 500 amperes. In some embodiments, high electrical current strength may mean a current strength of over 800 amperes. A current strength greater than or equal to 1000 amperes is also conceivable. The term "high electrical voltage" is understood to be a voltage of over 1 kilovolt. In some embodiments, a voltage of over 10 kilovolts is meant. In some embodiments, a voltage of over 15 kilovolts is meant. A current strength greater than or equal to 25 kilovolts is also conceivable.

In one embodiment, the electrical conductors of the mesh network are designed so that they terminate at both ends in connectors of essentially the same structure. This means that the conductors have the same connectors at their respective ends. By virtue of this embodiment, a wide range of different conductors can be prefabricated, such as cables with a cross-section which is sufficient according to the definition of high current strength or high electrical voltage. When replacement is required, the time expended can be reduced to an advantageous minimum level by the use of prefabricated cables.

At least one embodiment envisages that the connection devices are designed as electrical distributors with at least two terminals. The design of the connection devices as distributors is advantageous in the case of rail transportation systems such as electrically powered trainsets because, for safety reasons, redundancy must be created which cannot be produced practically with connection devices designed as a simple connection unit. Advantageous here are designs which provide the connection device as a T distributor, Y distributor, H distributor, or X distributor. Such connection devices are known from high-performance plug connector systems as described in DE 10 2020 108 458 A1.

In embodiments, the connectors may be designed as plug connectors which can be connected to the terminals of the connection device. An advantageous connection of the electrical conductors to the connection device can be achieved by the design as a plug connector. The connectors are skillfully designed as plug connectors with a locking element. Embodiments with so-called push-pull locking, a locking clip, a bayonet catch, or a combination of known locking elements are advantageous here. Such plug connectors are known from high-performance plug connector systems as described in the document DE 10 2020 108 458 A1.

In embodiments, the connectors may be formed as single-pole plug connectors. High-performance transmission is thus enabled such that the necessary loads of more than 100 A, sometimes more than 250 A, often more than 500 A, such as loads in a range from 650 A to 1000 A, can be reliably achieved by the power supply system. The connector designed as a single-pole plug connector is expediently fixed on the connection device with at least one locking element. Screws can simply be used here for the fixing. Abovementioned locking elements such as, for example, bayonet catch systems are also conceivable.

In embodiments, embodiment, at least one mesh of the power supply system in the form of a mesh network may be expanded by at least one tapping unit. This means that, in addition to the electrical conductors and the at least two connection devices which are used to form a mesh, a separate unit is used to enable connection to the energy-consuming device of the transportation means segment.

At least one embodiment skillfully envisages here that the tapping unit has at least two terminals which are formed with the same structure as the terminals of the connection devices and have at least one tap, wherein the tap is provided for electrically connecting the power supply system to the energy-consuming device. Consequently, prefabricated cables can be used here too which enable simple replacement in the case of damage. The embodiment is improved by a tap which is designed so that it is essentially identical to or at least compatible with the terminals of the connection devices.

At least one embodiment envisages designing the tapping unit with essentially the same structure as a connection device. In this way, the maintainability is increased simply and cost-effectively because each connection device and the tapping unit can be replaced by elements with the same structure. In some embodiments, spare parts storage may be reduced and thus made more favorable and space-saving.

One embodiment discloses the group of electrical loads as a rail transportation system. A rail transportation system is understood, such as, as freight trainsets and/or passenger trainsets. A trainset here means a formation consisting or comprising of at least one traction vehicle and at least one car. Alternatively, a formation of multiple power cars is also possible. Combinations of the said transportation system are of course also conceivable.

In an embodiment, the power supply system may be arranged below the floor of the transportation system. Below the floor refers to the area at the transportation system which is arranged between the transportation route and the transportation system itself. In other words, this means, for example, the underside of a car.

BRIEF DESCRIPTION OF THE SEVERAL VIEWS OF THE DRAWINGS

An embodiment of the disclosure is illustrated in the drawing and will be explained in detail below.

FIG. 1 shows a schematic illustration of a segment of a group of loads of a power supply system.

The FIGURES contain partially simplified schematic illustrations. Identical reference signs are used in part for the same but possibly non-identical elements. Different views of the same elements could be at a different scale.

DETAILED DESCRIPTION

FIG. 1 shows a schematic illustration of a segment of a group of loads 2 of a power supply system 1. A redundantly supplied segment of the group of loads 2 can be seen. A segment of the group of loads 2 designed in this way can be found, in particular, in the supplying of power to rail-guided transportation systems, for example, passenger railroad cars. Two connection devices 3 are here arranged in each case at a first end region 20 and at a second end region 21. The connection devices 3 are designed with in each case three terminals 30. The terminals 30 each receive a compatible connector 31. The connectors 31 are designed to establish both an electrical and a mechanical connection between the respective connection device 3, or the terminals 30 situated thereon, and an associated conductor 4. The two connection devices 3 in the first region 20 are connected directly to each other via a conductor 4 and associated connectors 31, situated thereon, which engage in the corresponding terminals 30. In the same way, the two connection devices 3 are connected to each other in the second end region 21 via a conductor 4 and associated connectors 31. The first end region 20 and the second end region 21 are furthermore, on the one hand, connected directly and, on the other hand, connected indirectly to each other by additional conductors 4 provided with associated connectors 31. In the case of an indirect connection, a tapping unit 5 is inserted between the connection device 3 of the first end region 20 and the connection device 3 of the second end region 21. The tapping unit 5 here supplies an energy-consuming device 22 by a tap 50. The tapping unit 5 expediently features at least two terminals 30 which are the same as the terminals 30 of the connection devices 3. The tapping unit 5 is ideally designed with at least fundamentally the same structure as the connection devices 3. As a result, a cost saving can be made by having fewer different structural units. Accordingly, the tap 50 is illustrated as being identical to the terminals 30 and connectors 31 of the connection units 3. The connection between the energy-consuming device 22 can be effected by a direct connection as in the example illustrated. Alternatively, the energy-consuming device 22 can also be provided with a terminal which is the same as the terminals 30 of the tapping unit 5 and/or the connection devices 3.

As many segments of the group of loads 2 as desired can be placed one after the other and interconnected by virtue of the essentially axially symmetrical structure of the first end region 20 and the second end region 21. By virtue of the design of the connection devices 3 with three terminals 30 of at least essentially the same structure, the connectors 31 can also be designed with the same structure. Assembly and maintenance are simplified as a result and at the same time storage for spare parts is considerably reduced.

Even though different aspects or features of the present disclosure are in each case shown in combination in the FIGURE, unless stated otherwise it is clear to a person skilled in the art that the combinations illustrated and discussed are not the only ones possible. In particular, mutually corresponding units or groups of features from different embodiments can be interchanged with one another. In other words, Aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A power supply system for groups of loads, comprising:

at least two segments of the group of loads, wherein each segment includes:

a first end region, a second end region, and at least one electrical energy-consuming device, wherein the electrical energy-consuming device is fed with electrical energy by the power supply system;

at least two connection devices which are arranged along the first end region and at least two connection devices which are arranged along the second end region, wherein each connection device includes at least three terminals for removably holding a respective electrical connector, and wherein the electrical connectors are connected to a respective end of one of a plurality of electrical conductors, and wherein the terminals of the connection devices are designed with a same structure such that the electrical connectors with a same structure are used both to connect the connection devices within each segment of the at least two segments of the group of loads and to connect the at least two segments of the group of loads together.

2. The power supply system according to claim 1, wherein the connection devices are designed as electrical distributors with at least three terminals.

3. The power supply system according to claim 1, wherein the electrical connectors are formed as single-pole plug connectors.

4. The power supply system according to claim 1, wherein at least one segment of the at least two segments of the group of loads is expanded by at least one tapping unit.

5. The power supply system according to claim 4, wherein the tapping unit has at least two terminals which are formed with a same structure as the terminals of the connection devices and have at least one tap, wherein the tap electrically connects the power supply system to the at least one energy-consuming device.

6. The power supply system according to claim 4, wherein the tapping unit is designed with a same structure as the connection devices.

7. The power supply system according to claim 1, wherein the group of loads is designed as a transportation system comprising the at least two segments of the group of loads, and wherein the transportation system has at least two transportation system segments.

8. The power supply system according to claim 7, wherein the transportation system is designed as a rail transportation system.

9. The power supply system according to claim 7, wherein the power supply system is arranged below a floor of the transportation system.

10. A transportation system, comprising:

at least two transportation system segments, wherein at least one transportation system segment of the at least two transportation segments is fed from the power supply system for groups of loads according to claim 1.

11. The transportation system according to claim 10, wherein a transportation system segment of the at least two transportation system segments has at least one transportation system segment connection device and is connected to a transportation system segment conductor at a first end region or a second end region of the transportation system segment, wherein a first end of the transportation system segment conductor has a connector which is compatible with one of the connection devices of the power supply system, and a second end of the transportation system segment conductor has a connector which differs from the connector of the first end of the transportation system segment conductor.

12. The power supply system according to claim 8, wherein the rail transportation system is a rail passenger transportation system.

* * * * *